(12) United States Patent
Wu et al.

(10) Patent No.: US 12,010,721 B2
(45) Date of Patent: Jun. 11, 2024

(54) INITIAL SIGNAL DETECTION METHOD AND APPARATUS

(71) Applicant: HUAWEI TECHNOLOGIES CO., LTD., Shenzhen (CN)

(72) Inventors: Ji Wu, Shanghai (CN); Jiayin Zhang, Shanghai (CN); Qiong Jia, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 480 days.

(21) Appl. No.: 17/403,264

(22) Filed: Aug. 16, 2021

(65) Prior Publication Data

US 2021/0378009 A1  Dec. 2, 2021

Related U.S. Application Data

(63) Continuation of application No. PCT/CN2020/075571, filed on Feb. 17, 2020.

(30) Foreign Application Priority Data

Feb. 15, 2019  (CN) .......................... 201910117894.5

(51) Int. Cl.
*H04W 74/08* (2009.01)
*H04W 16/14* (2009.01)
*H04W 74/0808* (2024.01)

(52) U.S. Cl.
CPC ....... *H04W 74/0808* (2013.01); *H04W 16/14* (2013.01)

(58) Field of Classification Search
CPC .......................... H04W 74/0808; H04W 16/14
See application file for complete search history.

(56) References Cited

U.S. PATENT DOCUMENTS

| 10,498,593 | B2* | 12/2019 | Yoo | H04L 5/006 |
|---|---|---|---|---|
| 11,184,926 | B2* | 11/2021 | Falahati | H04W 16/14 |
| 11,206,655 | B2* | 12/2021 | Moon | H04L 1/0046 |
| 11,622,279 | B2* | 4/2023 | Chen | H04L 5/001 |
| | | | | 370/329 |

(Continued)

FOREIGN PATENT DOCUMENTS

| CN | 102036297 A | 4/2011 |
|---|---|---|
| CN | 103688480 A | 3/2014 |
| CN | 104301273 A | 1/2015 |

(Continued)

OTHER PUBLICATIONS

R1-1806105, Nokia et al, Frame structure for NR-U operation, 3GPP TSG RAN WG1 Meeting #93, Busan, Korea, May 21-25, 2018, total 6 pages.

(Continued)

*Primary Examiner* — Chandrahas B Patel
(74) *Attorney, Agent, or Firm* — HAUPTMAN HAM, LLP

(57) ABSTRACT

An initial signal detection method includes performing, by a user equipment, detection on one or more sub-channels on an unlicensed spectrum, and determining, based on a combination of a group common-demodulation reference signal and a group common-physical downlink control channel that is detected by the user equipment a first time, that downlink transmission has started or that a channel occupancy time has started.

19 Claims, 12 Drawing Sheets

(56) References Cited

U.S. PATENT DOCUMENTS

2013/0094457 A1 4/2013 Seo et al.
2018/0368126 A1 12/2018 Islam et al.

FOREIGN PATENT DOCUMENTS

| CN | 105592467 A | 5/2016 |
|---|---|---|
| CN | 106851827 A | 6/2017 |
| CN | 107079464 A | 8/2017 |
| CN | 108811120 A | 11/2018 |
| WO | 2017077388 A1 | 5/2017 |

OTHER PUBLICATIONS

3GPP TS 38.211 V15.4.0 (Dec. 2018), 3rd Generation Partnership Project; Technical Specification Group Radio Access Network; NR; Physical channels and modulation (Release 15), 96 pages.
3GPP TSG RAN WG1 Meeting #95, R1-1812696, On DL Signals and Channels for NR-U, Nokia, Nokia Shanghai Bell, Spokane, USA, Nov. 12-16, 2018, total 17 pages.
3GPP TS 38.213 V15.4.0: "3rd Generation Partnership Project; Technical Specification Group Radio Access Network; NR; Physical layer procedures for control (Release 15)", Dec. 2018, total 104 pages.
Chinese Office Action issued in corresponding Chinese Application No. 201910117894.5, dated Jan. 22, 2021, pp. 1-4.
Chinese Search Report issued in corresponding Chinese Application No. 201910117894.5, dated Jan. 16, 2021, pp. 1-2.
International Search Report issued in corresponding International Application No. PCT/CN2020/075571, dated May 9, 2020, pp. 1-8.
Huawei et al: "DL channels and signals in NR unlicensed band" 3GPP Draft; R1-1900057, Jan. 20, 2019, XP051592983, total 9 pages.
European Search Report issued in corresponding European Application No. 20756666.2, dated Mar. 21, 2022, pp. 1-10.

* cited by examiner

INITIAL SIGNAL DETECTION METHOD AND APPARATUS

CROSS-REFERENCE TO RELATED APPLICATIONS

This application is a continuation of International Application No. PCT/CN2020/075571, filed on Feb. 17, 2020, which claims priority to Chinese Patent Application No. 201910117894.5, filed on Feb. 15, 2019, The disclosures of the aforementioned applications are hereby incorporated by reference in their entireties.

TECHNICAL FIELD

This application relates to the field of wireless communication technologies, and in particular, to an initial signal detection method and apparatus.

BACKGROUND

A device operating in an unlicensed frequency band (unlicensed frequency band) can automatically detect, without authorization, whether a channel is idle and access the channel to work. To ensure coexistence and fairness with another device that works in the unlicensed frequency band, 3GPP R13 specifies use of a listen-before-talk (LBT: Listen-Before-Talk) channel contention access mechanism.

An eNB operating in the unlicensed frequency band may start LBT at any time. Due to uncertainty of occurrence and duration of interference generated by another system, LBT may end at any time. How to efficiently use a time domain resource on which LBT succeeds is a concern of this application.

SUMMARY

This application provides a more efficient initial signal detection mechanism applied to an unlicensed spectrum.

According to one aspect, an initial signal detection method is provided, including: UE performs detection on one or more sub-channels on an unlicensed spectrum; and determines, based on a combination that is of a GC-DMRS and a GC-PDCCH and that is detected for the first time, that downlink transmission has started or that a COT has started. A configuration of a search space (search space) of an initial signal of the UE meets one or any combination of the following: An aggregation level (aggregation level) of a GC-PDCCH in the initial signal is set to a fixed value. Alternatively, a maximum quantity of blind detection times of a GC-PDCCH in the initial signal is one or two times in each slot.

The foregoing configuration may be specified in a standard, or configured by a network side for one or more UEs (for example, a UE group in a cell). Preferably, the combination that is of a GC-DMRS and a GC-PDCCH and that is detected by the UE for the first time is located on a symbol 1, 3, or 7 in a slot, and the method further includes: The UE continues to search for a first UE-specific PDCCH of the UE in a search space (search space) of the GC-PDCCH. The first UE-specific PDCCH uses an NR DCI 1_0 format.

According to another aspect, a corresponding initial signal sending method is provided, including: A network side performs LBT on one or more sub-channels on an unlicensed spectrum. The network side sends one or more combinations of a GC-DMRS and a GC-PDCCH on one or more sub-channels on which LBT succeeds, where one of the one or more combinations of a GC-DMRS and a GC-PDCCH is used as an initial signal for downlink transmission. A configuration of a search space (search space) of an initial signal of one or more UEs meets one or any combination of the following: An aggregation level (aggregation level) of a GC-PDCCH in the initial signal is set to a fixed value. Alternatively, a maximum quantity of blind detection times of a GC-PDCCH in the initial signal is one or two times for each symbol on which detection is performed. The foregoing configuration may be specified in a standard, that is, is directly configured during initialization of a communications system. In addition, the foregoing configuration may be configuration information that is of the search space (search space) of the initial signal of the one or more UEs and that is sent by the network side. Specifically, the first sent combination of a GC-DMRS and a GC-PDCCH is located at a start location of a COT. In another example, one of the sent one or more combinations of a GC-DMRS and a GC-PDCCH is located at a symbol 1, 3, or 7 in a slot, where a search space of the GC-PDCCH includes a first UE-specific PDCCH of one or more UEs. The first UE-specific PDCCH uses an NR DCI 1_0 format. In another example, one of the one or more combinations of a GC-DMRS and a GC-PDCCH is located at a symbol 0 in a slot, where outside a search space of the GC-PDCCH, a search space of a UE-specific PDCCH includes one or more UE-specific PDCCHs.

This application correspondingly provides a network side apparatus, including an apparatus, for example, a device or a board, and a terminal side apparatus, including a terminal, a chip, or another possible apparatus.

According to another aspect, a communications system is provided. The communications system includes a network device and a terminal, and the network device may be the network device described above. The terminal is the terminal described above.

According to another aspect, a computer-readable storage medium is provided. The readable storage medium stores instructions. When the instructions are run on a computer, the computer is enabled to perform the signal transmission method described above.

According to another aspect, a computer program product including instructions is provided. When the instructions are run on a computer, the computer is enabled to perform the foregoing signal transmission method.

BRIEF DESCRIPTION OF DRAWINGS

To describe technical solutions in embodiments of this application or in the background more clearly, the following describes accompanying drawings used for describing the embodiments of this application or the background.

DESCRIPTION OF EMBODIMENTS

Some terms used in implementations of this application are merely intended to explain specific embodiments of this application, but are not intended to limit this application.

Figure 1:
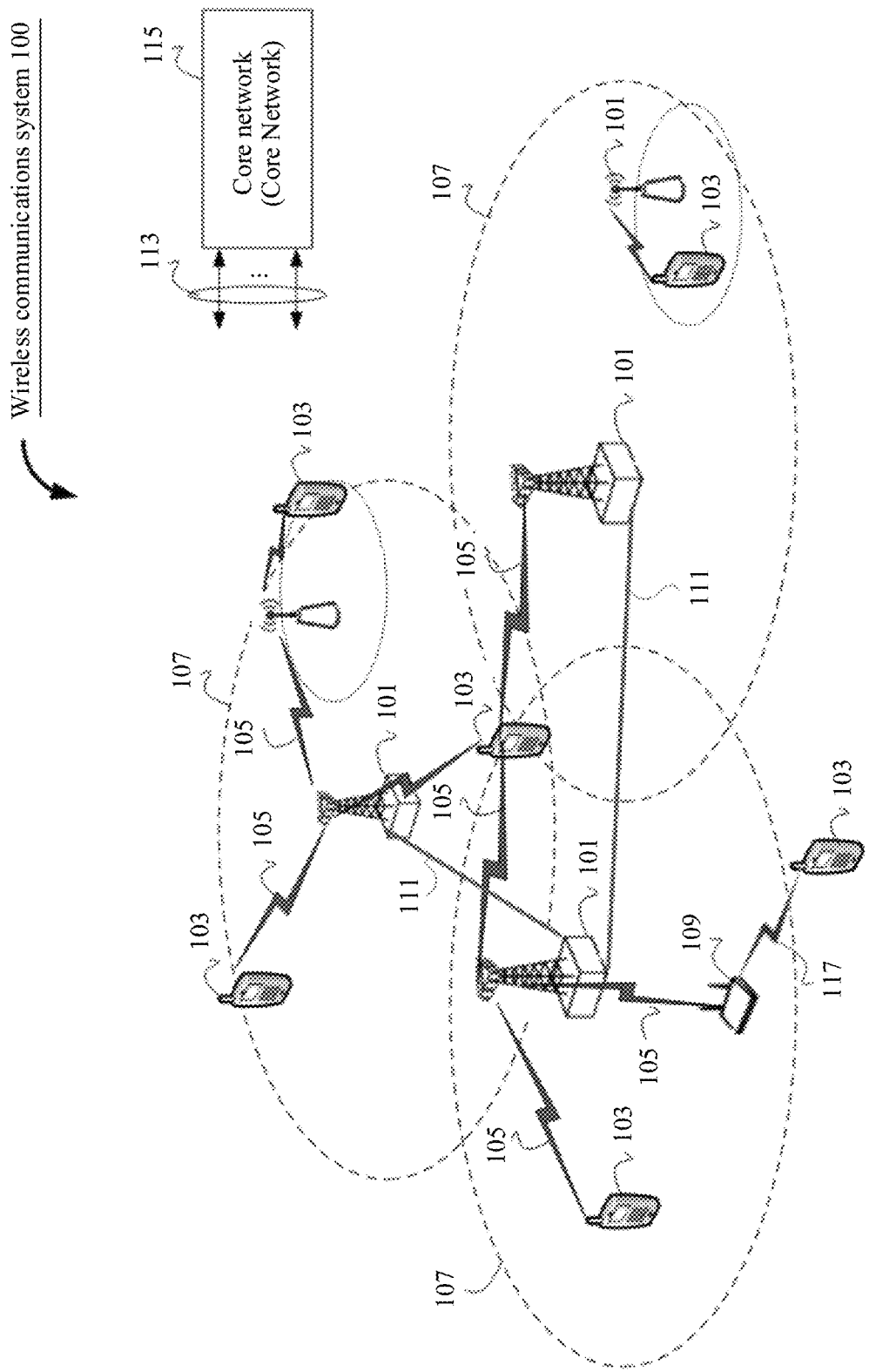
FIG. 1 is a schematic architectural diagram of a wireless communications system according to this application.

FIG. 1 shows a wireless communications system 100 according to this application. The wireless communications system 100 may operate in a licensed frequency band, or may operate in an unlicensed frequency band. It can be understood that use of the unlicensed frequency band can increase a system capacity of the wireless communications system 100. As shown in FIG. 1, the wireless communications system 100 includes one or more network devices (Base Station) 101, for example, a network device (for example, a gNB), an eNodeB, or a WLAN access point, one or more terminals (Terminal) 103, and a core network 115.

The network device 101 may be configured to communicate with the terminal 103 under control of a network device controller (for example, a base station controller) (not shown). In some embodiments, the network device controller may be a part of the core network 115, or may be integrated into the network device 101.

The network device 101 may be configured to transmit control information (control information) or user data (user data) to the core network 115 by using a backhaul (backhaul) interface (for example, an S1 interface) 113.

The network device 101 may perform wireless communication with the terminal 103 by using one or more antennas. Each network device 101 may provide communication coverage for a coverage area 107 corresponding to the network device 101. The coverage area 107 corresponding to the access point may be divided into a plurality of sectors (sector), and one sector corresponds to a part of the coverage area (not shown).

The network devices 101 may also directly or indirectly communicate with each other by using a backhaul (backhaul) link 211. The backhaul link 111 herein may be a wired communication connection, or may be a wireless communication connection.

In some embodiments of this application, the network device 101 may include a base transceiver station (Base Transceiver Station), a wireless transceiver, a basic service set (Basic Service Set, BSS), an extended service set (Extended Service Set, ESS), a NodeB, an eNodeB, a network device (for example, a gNB), and the like. The wireless communications system 100 may include several different types of network devices 101, for example, a macro base station (macro base station), a micro base station (micro base station), and the like. The network device 101 may use different wireless technologies, for example, a cell radio access technology or a WLAN radio access technology.

The terminal 103 may be distributed in the entire wireless communications system 100, and may be static or mobile. In some embodiments of this application, the terminal 103 may include: mobile equipment, a mobile station (mobile station), a mobile unit (mobile unit), a radio unit, a remote unit, a user agent, a mobile client, or the like. In this application, the terminal may also be understood as a terminal device.

In this application, the wireless communications system 100 may be an LTE communications system, for example, an LTE-U system, that can work in the unlicensed frequency band, and may be a new radio communications system, for example, an NRU system, that can work in the unlicensed frequency band, or may be another communications system that works in the unlicensed frequency band in the future.

In addition, the wireless communications system 100 may further include a Wi-Fi network.

Figure 2:
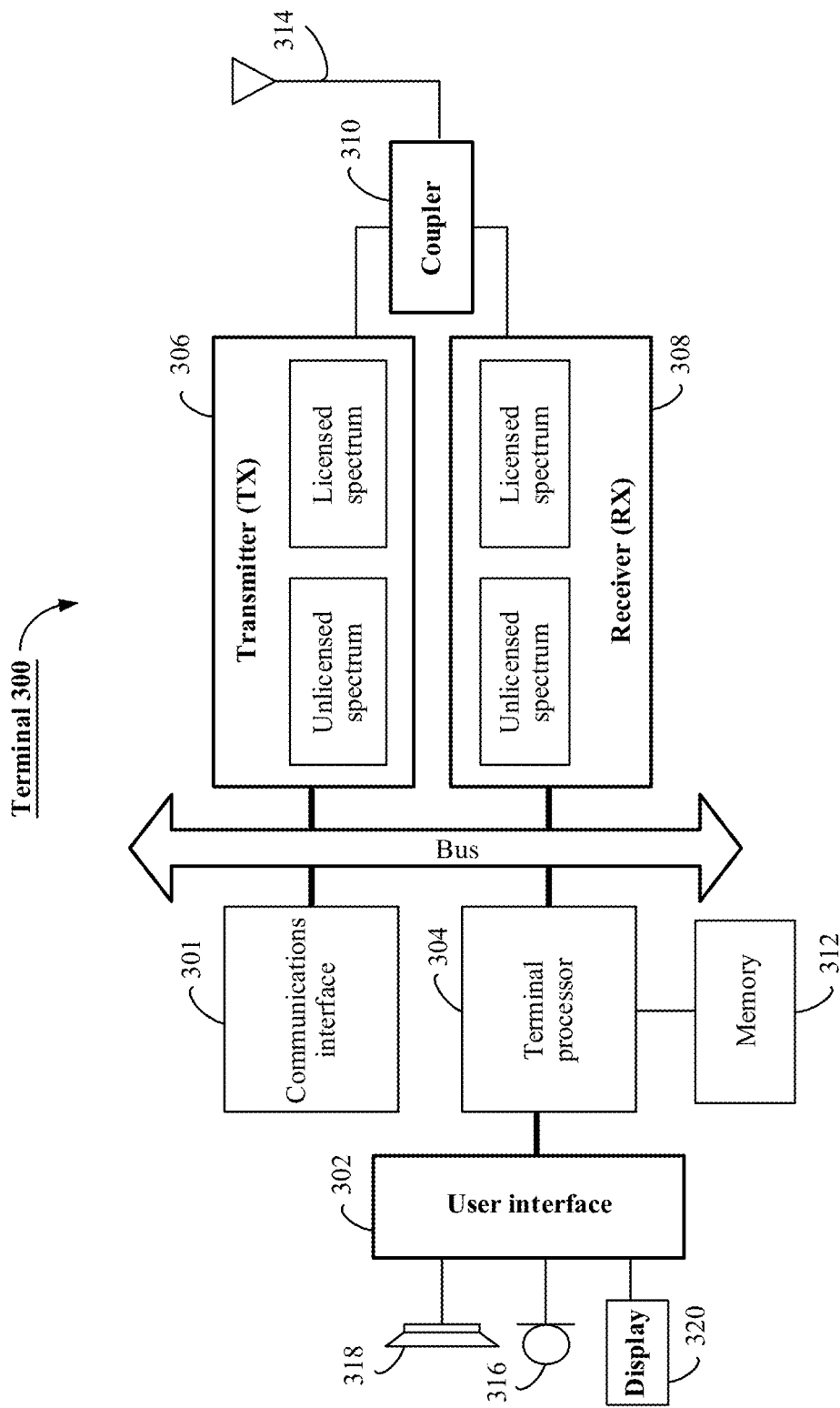
FIG. 2 is a schematic diagram of a hardware architecture of a terminal device according to an embodiment of this application.

FIG. 2 shows a terminal 300 according to some embodiments of this application. As shown in FIG. 2, the terminal 300 may include input/output modules (including an audio input/output module 318, a key input module 316, a display 320, and the like), a user interface 302, one or more terminal processors 304, a transmitter 306, a receiver 308, a coupler 310, an antenna 314, and a memory 312. These components may be connected through a bus or in another manner. As shown in FIG. 2, for example, the components are connected through the bus.

A communications interface 301 may be used by the terminal 300 to communicate with another communications device, for example, a base station. Specifically, the base station may be a network device 400 shown in FIG. 3. The communications interface 301 is an interface between the terminal processor 304 and a transceiver system (including the transmitter 306 and the receiver 308), for example, an X1 interface in LTE. In a specific implementation, the communications interface 301 may include one or more of a global system for mobile communications (Global System for Mobile Communications, GSM) (2G) communications interface, a wideband code division multiple access (Wideband Code Division Multiple Access, WCDMA) (3G) communications interface, a long term evolution (Long Term Evolution, LTE) (4G) communications interface, and the like, or may be a 4.5G, 5G, or future new radio communications interface. In addition to a wireless communications interface, a wired communications interface 301, for example, a local area network (Local Access Network, LAN) interface may further be configured for the terminal 300.

The antenna 314 may be configured to convert electromagnetic energy in a transmission line into an electromagnetic wave in free space, or convert an electromagnetic wave in free space into electromagnetic energy in a transmission line. The coupler 310 is configured to divide a mobile communication signal received by the antenna 314 into a plurality of signals, and allocate the signals to a plurality of receivers 308.

The transmitter 306 may be configured to perform transmission processing on a signal output by the terminal processor 304, for example, modulate the signal in a licensed frequency band, or modulate the signal in an unlicensed frequency band.

The receiver 308 may be configured to perform receiving processing on the mobile communication signal received by the antenna 314. For example, the receiver 308 may demodulate a received signal that has been modulated in an unlicensed frequency band, or demodulate a received signal that has been modulated in a licensed frequency band.

In some embodiments of this application, the transmitter 306 and the receiver 308 may be considered as a wireless modem. In the terminal 300, there may be one or more transmitters 306 and one or more receivers 308.

In addition to the transmitter 306 and the receiver 308 shown in FIG. 2, the terminal 300 may further include another communications component, for example, a GPS module, a Bluetooth (Bluetooth) module, or a wireless fidelity (Wireless Fidelity, Wi-Fi) module. In addition to the wireless communication signal described above, the terminal 300 may further support another wireless communication signal, for example, a satellite signal or a short-wave signal. In addition to wireless communication, the terminal 300 may be further equipped with a wired network interface (for example, a LAN interface) to support wired communication.

The input/output modules may be configured to implement interaction between the terminal 300 and a user/an external environment, and may mainly include the audio input/output module 318, the key input module 316, the display 320, and the like. In a specific implementation, the input/output modules may further include a camera, a touchscreen, a sensor, and the like. The input/output modules all communicate with the terminal processor 304 through the user interface 302.

The memory 312 is coupled to the terminal processor 304, and is configured to store various software programs and/or a plurality of sets of instructions. In a specific implementation, the memory 312 may include a high-speed random access memory, and may further include a non-volatile memory, for example, one or more disk storage devices, a flash storage device, or another non-volatile solid-state storage device. The memory 312 may store an operating system (briefly referred to as a system below), for example, an embedded operating system such as Android, iOS, Windows, or Linux. The memory 312 may further store a network communications program. The network communications program may be configured to communicate with one or more additional devices, one or more terminal devices, and one or more network devices. The memory 312 may further store a user interface program. The user interface program may use a graphical operation interface to vividly display content of an application program, and use input controls such as menus, dialog boxes, and keys to receive control operations of a user on the application program.

In some embodiments of this application, the memory 312 may be configured to store a program for implementing, on a terminal 300 side, of a signal transmission method provided in one or more embodiments of this application. For an implementation of the signal transmission method provided in the one or more embodiments of this application, refer to the subsequent embodiments.

The terminal processor 304 may be configured to read and execute computer-readable instructions. Specifically, the terminal processor 304 may be configured to invoke a program stored in the memory 312, for example, the program for implementing, on the terminal 300 side, of the signal transmission method provided in the one or more embodiments of this application, and execute instructions included in the program.

It may be understood that the terminal 300 may be the terminal 103 in the wireless communications system 100 shown in FIG. 1, and may be implemented as mobile equipment, a mobile station (mobile station), a mobile unit (mobile unit), a radio unit, a remote unit, a user agent, a mobile client, or the like.

It should be noted that the terminal 300 shown in FIG. 2 is merely an implementation of this application. In actual application, the terminal 300 may further include more or fewer components, and this is not limited herein.

Figure 3:
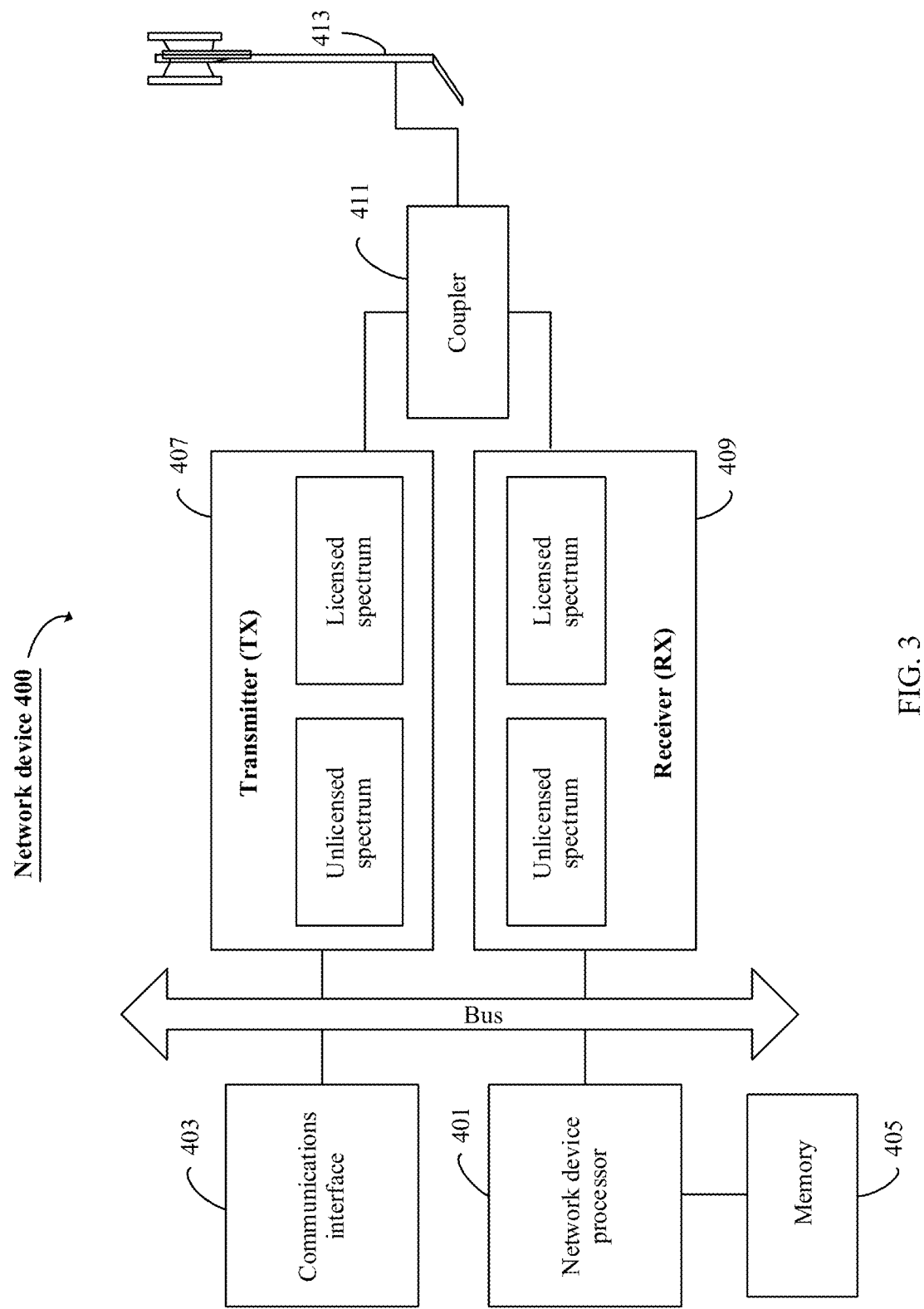
FIG. 3 is a schematic diagram of a hardware architecture of a network device according to an embodiment of this application.

FIG. 3 shows a network device 400 according to some embodiments of this application. As shown in FIG. 3, the network device 400 may include a communications interface 403, one or more base station processors 401, a transmitter 407, a receiver 409, a coupler 411, an antenna 413, and a memory 405. These components may be connected through a bus or in another manner. As shown in FIG. 3, for example, the components are connected through the bus.

The communications interface 403 may be used by the network device 400 to communicate with another communications device, for example, a terminal device or another base station. Specifically, the terminal device may be the terminal 300 shown in FIG. 2. The communications interface 301 is an interface between the base station processor 401 and a transceiver system (including the transmitter 407 and the receiver 409), for example, an S1 interface in LTE. In a specific implementation, the communications interface 403 may include one or more of a global system for mobile communications (GSM) (2G) communications interface, a wideband code division multiple access (WCDMA) (3G) communications interface, a long term evolution (LTE) (4G) communications interface, and the like, or may be a 4.5G, 5G, or future new radio communications interface. In addition to a wireless communications interface, a wired communications interface 403 may further be configured for the network device 400 to support wired communication. For example, a backhaul link between one network device 400 and another network device 400 may be a wired communication connection.

The antenna 413 may be configured to convert electromagnetic energy in a transmission line into an electromagnetic wave in free space, or convert an electromagnetic wave in free space into electromagnetic energy in a transmission line. The coupler 411 may be configured to divide a mobile communication signal into a plurality of signals, and allocate the plurality of signals to a plurality of receivers 409.

The transmitter 407 may be configured to perform transmission processing on a signal output by the base station processor 401, for example, modulate the signal in a licensed frequency band, or modulate the signal in an unlicensed frequency band.

The receiver 409 may be configured to perform receiving processing on the mobile communication signal received by the antenna 413. For example, the receiver 409 may demodulate a received signal that has been modulated in an unlicensed frequency band, or demodulate a received signal that has been modulated in a licensed frequency band.

In some embodiments of this application, the transmitter 407 and the receiver 409 may be considered as a wireless modem. In the network device 400, there may be one or more transmitters 407 and one or more receivers 409.

The memory 405 is coupled to the base station processor 401, and is configured to store various software programs and/or a plurality of sets of instructions. In a specific implementation, the memory 405 may include a high-speed random access memory, and may further include a non-volatile memory, for example, one or more disk storage devices, a flash storage device, or another non-volatile solid-state storage device. The memory 405 may store an operating system (briefly referred to as a system below), for example, an embedded operating system such as uCOS, VxWorks, or RTLinux. The memory 405 may further store a network communications program. The network communications program may be configured to communicate with one or more additional devices, one or more terminal devices, and one or more network devices.

The base station processor 401 may be configured to manage a radio channel, make a call, establish or remove a communications link, control inter-cell handover of user equipment in a local control region, and the like. In a specific implementation, the base station processor 401 may include: an administration module/communication module (Administration Module/Communication Module, AM/CM) (a center for speech channel switching and information exchanging), a basic module (Basic Module, BM) (configured to implement call processing, signaling processing, radio resource management, radio link management, and circuit maintenance functions), a transcoder and submultiplexer (Transcoder and Submultiplexer, TCSM) (configured to implement multiplexing, demultiplexing, and transcoding functions), and the like.

In this application, the base station processor 401 may be configured to read and execute computer readable instructions. Specifically, the base station processor 401 may be configured to invoke a program stored in the memory 405, for example, a program for implementing, on a network device 400 side, the signal transmission method provided in one or more embodiments of this application, and execute instructions included in the program.

It may be understood that the network device 400 may be the network device 101 in the wireless communications system 100 shown in FIG. 1, and may be implemented as a base transceiver station, a wireless transceiver, a basic service set (BSS), an extended service set (ESS), a NodeB, an eNodeB, or the like. The network device 400 may be implemented as several different types of base stations, for example, a macro base station, a micro base station, and the like. The network device 400 may use different wireless technologies, for example, a cell radio access technology or a WLAN radio access technology.

It should be noted that the network device 400 shown in FIG. 3 is merely an implementation of this application. In actual application, the network device 400 may further include more or fewer components, and this is not limited herein.

To facilitate the following descriptions, technical terms that may be involved in this specification are provided first.

| English acronyms and abbreviations | Full English expression/ Standard English term | Chinese expression/ Chinese term |
|---|---|---|
| LTE | Long Term Evolution | Long term evolution |
| Paging | Paging | Paging |
| eNB | eNodeB | LTE base station |
| gNB | gNodeB | NR base station |
| UE | User Equipment | User equipment |
| RRC | Radio Resource control | Radio resource control |
| IMSI | International Mobile Subscriber Identity | International mobile subscriber identity |
| BFT | Beamforming training | Beamforming training |
| DCI | Downlink control information | Downlink control information |
| BPL | Beam Pair Link | Beam pair link |
| RA | Random Access | Random access |
| C-RNTI | Cell Radio Network Temporary Identifier | Cell radio network temporary identifier |
| SS Burst Set | SS Burst Set | SS Burst Set |
| Beam | Beam | Beam |
| NR | New Radio | 5G, next-generation cellular wireless communications system |
| PDCCH | Physical downlink control channel | Downlink control channel |
| SS/PBCH BLOCK | Synchronization signal/ PBCH block | Synchronization signal block |
| BCH | Broadcast channel | Broadcast channel |
| PBCH | Physical broadcast channel | Physical broadcast channel |
| RMSI | Remaining minimum system information | Remaining minimum system information |

-continued

| English acronyms and abbreviations | Full English expression/ Standard English term | Chinese expression/ Chinese term |
|---|---|---|
| OSI | Other system information | Other system information |
| CORESET | Control resource set | Control resource set |
| DCI | Downlink control information | Downlink control information |
| PDSCH | Physical downlink shared channel | Physical downlink shared channel |
| DMRS | Demodulation reference signal | Demodulation reference signal |
| RLM | Radio link monitoring | Radio link (quality) monitoring |
| RSRP | Reference signal received power | Reference signal received power |
| RSRQ | Reference signal received quality | Reference signal received quality |
| CSI-RS | Channel state information- reference signal | Channel state information- reference signal |
| GC-PDCCH | Group-common PDCCH | Group-common downlink control channel |
| CORESET | Control resource set | Control resource set |
| RRC | Radio Resource Control | Radio resource control |
| GC-DCI | Group-common Downlink control information | Group-common downlink control information |

Figure 4A:
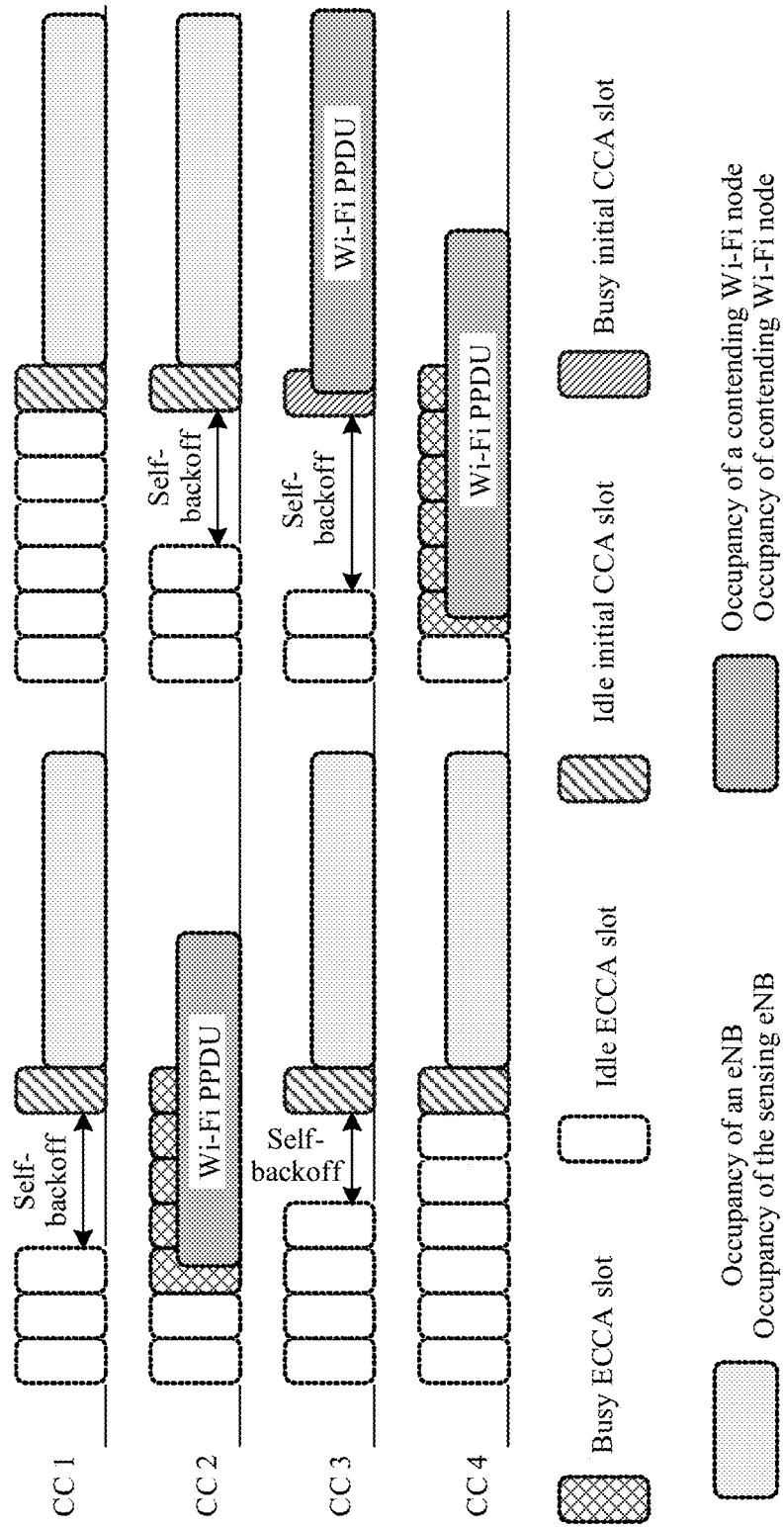
FIG. 4A and FIG. 4B are schematic diagrams of a Type A/Type B multi-carrier LBT mechanism according to this application.
Figure 4B:
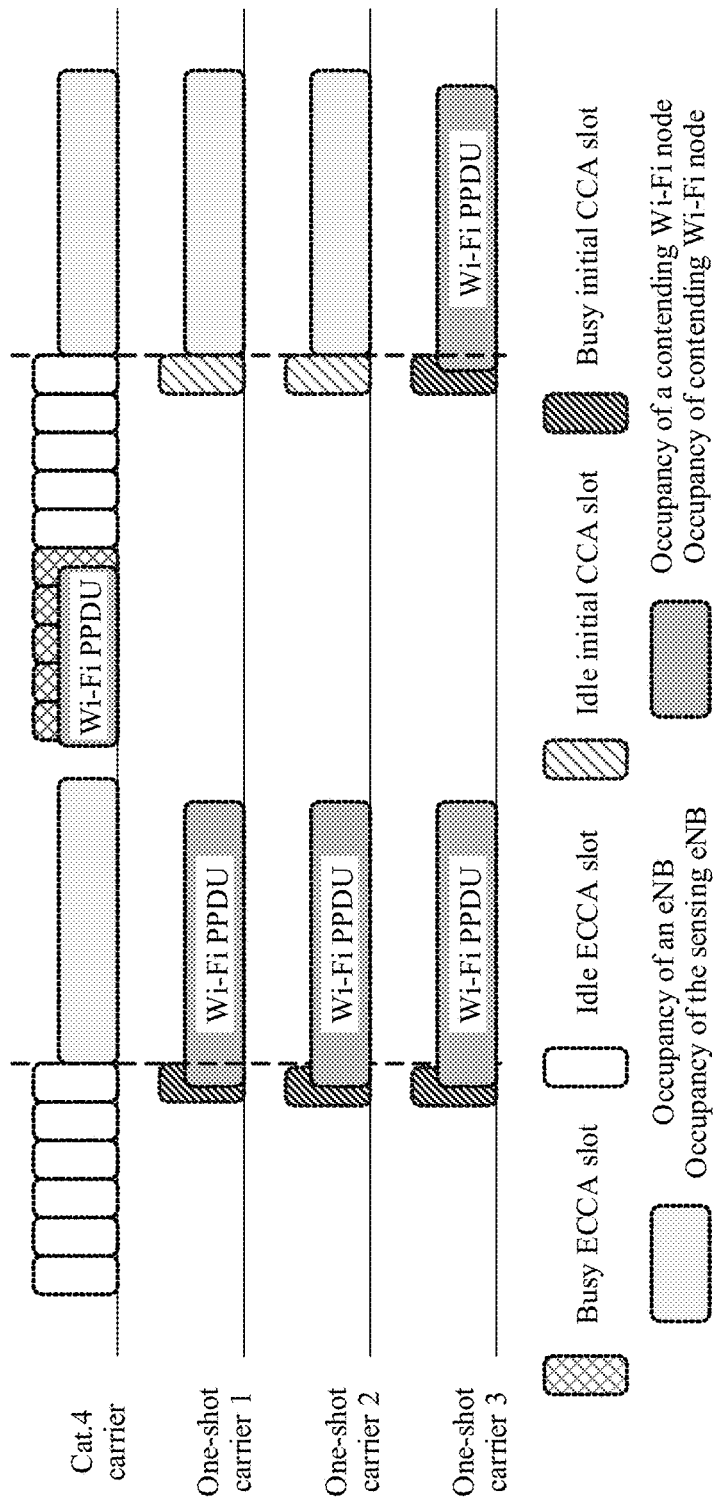

To ensure coexistence with another device that works in the unlicensed frequency band, the NRU system uses an LBT channel contention access mechanism, and an LBT process and parameter are specified in 3GPP R13. FIG. 4A and FIG. 4B show two types of LBT listening mechanisms.

As shown in FIG. 4A, an LBT device of a type A (Type A) may perform independent backoff on a plurality of component carriers (component carrier, CC), and after backoff is completed on a carrier, transmission is delayed to wait for another component carrier on which backoff is still being performed. After backoff is completed on all carriers on which LBT is performed, the device needs to perform additional one-shot CCA (25 μs clear channel assessment) to ensure that all the carriers are idle. If all the carriers are idle, the eNB simultaneously performs transmission on the idle carriers.

As shown in FIG. 4B, an LBT device of a type B (Type B) performs backoff only on a selected component carrier, and when backoff ends, performs one-shot CCA (25 μs clear channel assessment) look back on another component carrier. If the component carrier is idle, data transmission is performed. If the component carrier is not idle, data transmission cannot be performed on the component carrier this time.

As shown in FIG. 4A and FIG. 4B, a device for performing LBT may be an LTE LAA communications device, a Wi-Fi communications device, an NRU communications device, or another communications device that works in the unlicensed (unlicensed) frequency band. In the figures, interference received by the device when performing LBT comes from a Wi-Fi system. In an actual scenario, interference received by the device performing LBT may also come from an LTE LAA communications system, an NRU communications system, or another communications system that works in the unlicensed frequency band. This is not limited in this application.

Not limited to FIG. 4A and FIG. 4B, the LBT listening mechanism used by the NR U system may be changed. This does not affect implementation of this application.

Figure 5:
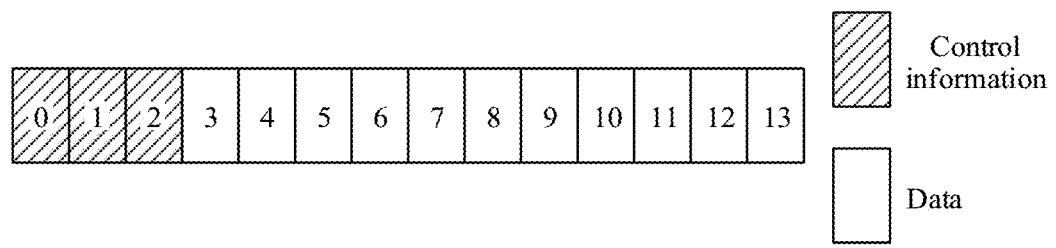
FIG. 5 is a schematic diagram of a frame structure conforming to a slot in LTE according to this application.

A frame structure applied in this application may be a radio frame structure of LTE or evolved versions thereof. For example, as shown in FIG. 5, a typical frame structure specified in LTE includes 14 OFDM symbols (briefly referred to as symbols below) in one scheduling slot (slot), the first one, two, or three symbols carry control information (DCI), and the last 11, 12, or 13 symbols carry data. In new radio NR, to improve system scheduling flexibility, a mini-slot (mini-slot) is introduced, and a length of the mini-slot may be two, four, or seven OFDM symbols. In an example shown in FIG. 6, one slot includes three 4-symbol mini-slots and one 2-symbol mini-slot. Certainly, one slot may also be a combination of other mini-slots. In each mini-slot, first n symbols of the first symbol carry a control resource set (CORESET) of the mini-slot, and is used to carry scheduling information (DCI) of the mini-slot. Specifically, n is a natural number, and is less than a quantity of symbols in the mini-slot. Preferably, n does not exceed 3.

A difference between GC-DCI and UE-specific DCI that are mentioned in this application is that the GC-DCI is scrambled by using a GC-RNTI, and all UEs associated with the gNB can perform parsing by using the GC-RNTI. The UE-specific DCI is usually scrambled by using a C-RNTI of each UE and includes downlink scheduling information of the UE. Other UEs do not need to perform parsing and do not perform parsing.

Based on the foregoing embodiments respectively corresponding to the wireless communications system 100, the terminal 300, and the network device 400, this application provides a signal transmission method, and provides a method for sending an initial signal after network side LBT succeeds and a method for performing initial signal detection on a UE side, and a corresponding apparatus and system.

Implementation 1

Figure 6:
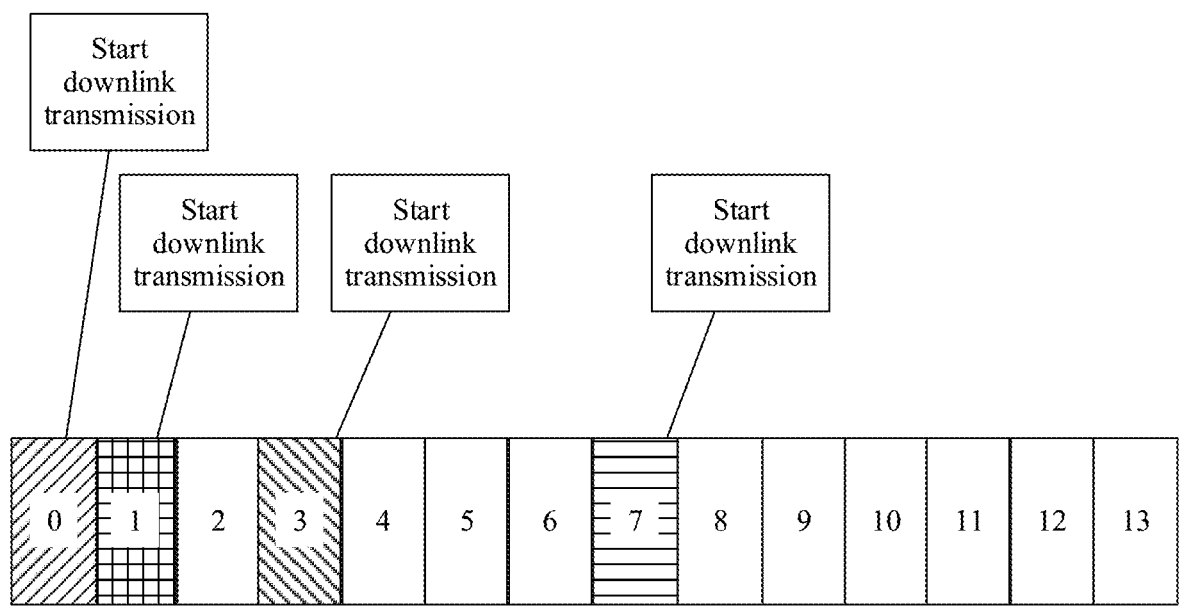
FIG. 6 is a schematic diagram of a frame structure of a mini-slot according to an embodiment of this application.

Refer to FIG. 6. Before sending downlink data or a reference signal, a gNB needs to perform LBT to obtain a channel access right, that is, the gNB can perform transmission only after LBT succeeds. Since LBT may succeed at any time, the gNB may start downlink transmission at a position other than a start position of a slot. Refer to FIG. 6. Numerals 0, 1, 2, . . . , and 13 are numbers of symbols in a 14-symbol slot, and the gNB may start transmission at a symbol 0, 1, 3, or 7 in one slot. When transmission starts from the symbol 1, 3, or 7, the first slot is a partial slot (where the slot includes fewer than 14 symbols), and subsequently, one or more full slots may be used for downlink transmission. The last slot within a COT may also be a partial slot (subsequent slots are not shown in FIG. 6).

In a solution, a DMRS of a PDCCH or a DMRS of a group-common PDCCH may be used for downlink transmission detection, that is, the UE may determine, by detecting the DMRS, whether the gNB has passed LBT and started downlink transmission (at least DMRS of any [PDCCH or GC-PDCCH] can be used by UE to detect transmission bursts by the serving gNB). Generally, detecting the DMRS of the GC-PDCCH is more advantageous than detecting a DMRS of the UE-specific PDCCH. This is because all UEs in a serving cell need to obtain the initial signal (DMRS of GC-PDCCH is more preferred than DMRS of UE specific PDCCH because the initial signal is required by all UE within the serving cell). However, in the foregoing solution, DMRSs used for downlink detection are sparse on time-frequency resources, resulting in poor detection performance.

In another solution, both a group-common DMRS (GC-DMRS) and a GC-PDCCH are used by the UE to perform downlink transmission detection, to improve detection reliability (The group common PDCCH together with its DMRS should be used by UE to identify the DL burst from serving cell). The group-common PDCCH is a group common downlink physical control channel, and is used to carry GC-DCI. The GC-DCI may be used to carry a system common message, for example, a remaining length of the COT, or whether each slot in a remaining time of the COT is used for uplink or downlink.

In a implementation, after obtaining the COT (that is, LBT succeeds), the gNB should send the GC-DMRS and the GC-PDCCH at least at a start of the COT. In addition, the GC-DMRS and the GC-PDCCH may be sent a plurality of times within the COT. One or more combinations that are of a GC-DMRS and a GC-PDCCH and that are sent by the gNB after LBT succeeds may be used as an initial signal. Specifically, the UE determines a start of downlink transmission (DL burst) based on a first received GC-DMRS and GC-PDCCH. A subsequent GC-DMRS and GC-PDCCH that are received by the UE within the COT do not need to be used to determine the start of the COT, and processing needs to be performed based on only common control information carried in a recently received GC-PDCCH. The GC-PDCCH sent each time carries common control information, for example, GC-DCI, used to indicate or update a structure of the COT, for example, indicate the remaining time of the COT, or indicate an uplink and downlink structure in remaining one or more slots.

Specifically, refer to section 10.1 of 3GPP 38.213, a formula for performing PDCCH blind detection by the UE in the configured CORESET is as follows:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \lfloor N_{CCE,p} / L \rfloor \right\} + i \quad \text{(Formula 1)}$$

L is an aggregation level, and a value may be 1, 2, 4, 8, or 16. A quantity of symbols configured in the CORESET is 1, 2, or 3. For the GC-PDCCH, $Y_{p,n_{s,f}^\mu}=0$, that is, an initial offset value of the GC-PDCCH is 0. i=0, 1, . . . , and L. $N_{CCE,p}$ is a quantity of control channel elements (CCE, Control channel element) included in a subband. For example, in a 20 MHz bandwidth and a 30 kHz subcarrier spacing configuration, eight CCEs are included in total. $m_{s,n_{CI}}=0, \ldots, M_{s,n_{CI}}^{(L)}-1$, where $M_{s,n_{CI}}^{(L)}$ is a quantity of PDCCH blind detections performed by the gNB on a carrier $n_{CI}$ when the aggregation level L in a search space S is configured for the UE. For the GC-PDCCH, $n_{CI}=0$. $M_{s,max}^{(L)}$ is a maximum quantity of PDCCH blind detections performed by the gNB on all carriers when the aggregation level L is configured for the UE.

In a specific implementation, each UE in a cell needs to detect a start of downlink transmission (a start of a COT) based on an initial signal (initial signal). Generally, when the UE misses or incorrectly detects the initial signal, the UE cannot obtain current COT information. Therefore, the UE needs to continuously blindly detect the initial signal based on a possible position of the initial signal in a partial slot until the initial signal is detected. However, the blind detection manner of the UE is excessive complex.

In the following implementation, a more optimal detection method is provided for the initial signal, to reduce complexity of blind detection of the initial signal by the UE.

Figure 7:
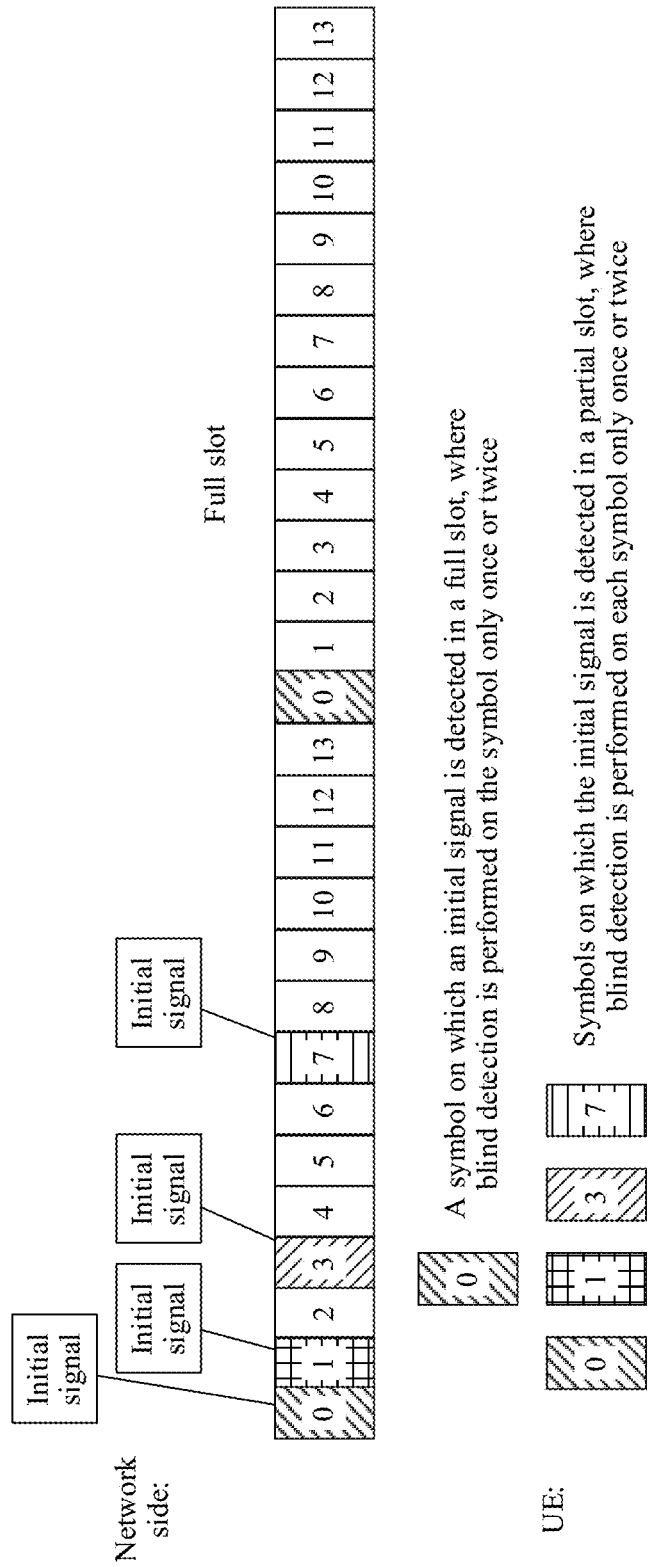
FIG. 7 is a simple schematic diagram of a symbol location for sending an initial signal by a gNB or a cell according to an embodiment of this application.

In this implementation, referring to FIG. 7, on a transmit side, in 101, a gNB or cell sends a GC-DMRS and a GC-PDCCH (where GC-DCI is carried on the GC-PDCCH) after LBT succeeds or within a COT start phase. Specifically, the GC-DMRS and the GC-PDCCH that are sent together, or referred to as a combination of the GC-DMRS and the GC-PDCCH, may be located at one or more same symbols (for example, 2 or 3) in time domain, or may be located on different REs in a same RB in frequency domain. A GC-DMRS and a GC-PDCCH that are sent together for the first time in a cell after LBT succeeds are used as an initial signal (initial signal) for downlink transmission by UE that receives a combination of the GC-DMRS and the GC-PDCCH.

Refer to FIG. 7. Preferably, a combination of a GC-DMRS and a GC-PDCCH may be sent a plurality of times within the COT. Specifically, if any one of a plurality of combinations of a GC-DMRS and a GC-PDCCH is a combination that is of a GC-DMRS and a GC-PDCCH and that is first received by UE, the combination that is of a GC-DMRS and a GC-PDCCH and that is first received by the UE is used as the initial signal for downlink transmission, that is, the UE determines, based on the combination that is of a GC-DMRS and a GC-PDCCH and that is first received by the UE, that the downlink transmission has started. Not all slots are shown in FIG. 7.

Specifically, each GC-DMRS and each GC-PDCCH that are sent each time may include one or more of a current COT remaining length, an uplink/downlink indication of one or more subsequent slots, and other common information.

Compared with the detection formula of the foregoing formula 1, especially for detection of the initial signal (detection of the DL burst) in this implementation, there may be the following different implementations, that is, a configuration of a search space of the initial signal complies with the foregoing formula 1, and meets one or any combination of the following:

Example 1: Based on a cell size and UE feedback, in a search space of an initial signal (the GC-DMRS and the GC-PDCCH that are received for the first time) configured by the network side (for example, a gNB or a cell) for one or more UEs, an aggregation level (aggregation level) of the GC-PDCCH in the initial signal is set to a fixed value. The value may be directly provided in a standard, or may be notified by the gNB to the UE in advance by using broadcast information/dedicated signaling such as a PBCH, RMSI, OSI, and RRC. RRC shown in Table 1 is a specific example. Specifically, the fixed value may be 4. In another example, the fixed value may be 8. Certainly, it may be 1, 2, or 16. Herein, an aggregation level (aggregation level) of a GC-PDCCH in an initial signal of one cell is set to a fixed value and does not change, and may be the same as or different from an aggregation level of a GC-PDCCH in an initial signal of another cell. Compared with setting of a common GC-PDCCH, an aggregation level of the common GC-PDCCH may be set to different values or changed based on transmission statuses. The normal GC-PDCCH refers to another GC-PDCCH that is sent within the COT and whose configuration may be different from that of the GC-PDCCH in the initial signal.

Example 2: A network side (for example, a gNB or a cell) may configure a quantity of blind detection times of an initial signal (the GC-DMRS and the GC-PDCCH that are received for the first time) in an initial signal search space of one or more UEs or a position of a symbol that needs to be detected. For example, for GC-PDCCH blind detection within the COT, $M_{s,max}^{(L)} = M_{s,0}^{(L)}$ in the foregoing formula 1 is fixed, and a value of $M_{s,0}^{(L)}$ may be 1 or 2. The value may be directly provided in a standard, or is notified by the gNB to the UE in advance by using broadcast information/dedicated signaling such as a PBCH, RMSI, OSI, and RRC.

In brief, one of combinations that are of a GC-DMRS and a GC-PDCCH and that are sent by the network side in NR-U may be used as an initial signal by the UE. Specifically, a combination that is of a GC-DMRS and a GC-PDCCH and that is received by the UE for the first time is used as the initial signal.

Specifically, on a transmit side, a combination that is of a GC-DMRS and a GC-PDCCH and that is sent by a network element on the network side has the following characteristics:

1. The combination of the GC-DMRS and the GC-PDCCH does not occur periodically.
2. The combination of the GC-DMRS and the GC-PDCCH is bound to the COT. That is, each combination of a GC-DMRS and a GC-PDCCH corresponds to one COT. Certainly, as described above, a plurality of sent combinations of a GC-DMRS and a GC-PDCCH may correspond to a same COT, and each GC-DMRS and GC-PDCCH separately carries common control information updated within the COT.

The initial signal search space configured by the network side for the one or more UEs has the following characteristics:

1. Detection frequencies (densities) of combinations of a GC-DMRS and a GC-PDCCH within and outside the COT are different. For example, first X symbols are detected in each slot within the COT, for example, only the first symbol (symbol 0) is detected. After the COT ends (outside the COT), detection is performed on a configured set of positions of symbols on which detection is performed in each slot. The configured set of positions of the symbols on which detection is performed may preferably be a symbol 0, 1, 3, or 7, or a combination of a GC-DMRS and a GC-PDCCH is detected every two symbols. Refer to symbol positions, at which initial signals are detected within and outside the COT, that are shown in FIG. 8a, FIG. 8b, FIG. 8c, and FIG. 8d. Certainly, in another implementation, different symbols may be detected based on a configuration.
2. An aggregation level of a GC-DMRS and a GC-PDCCH that are used as an initial signal is fixed, and a candidate quantity of blind detection times (number of candidates) corresponding to the aggregation level is set to 1 or 2. That is, blind detection is performed, only once or twice, on each symbol on which detection is performed. Alternatively, a candidate quantity of blind detection times is referred to as a maximum quantity of blind detections of the GC-PDCCH in the initial signal. An aggregation level of a GC-PDCCH that is not used as the initial signal may be configured to another value, and may be not fixed.

Specifically, in a conventional technology, there is GC-DMRS and/or GC-PDCCH search space configuration signaling. Configuration signaling (for example, RRC) of a search space of a GC-DMRS and a GC-PDCCH that can be used by the UE as an initial signal may be added to existing configuration signaling of a search space of a GC-DMRS and/or a GC-PDCCH, or may be independently notified or configured by the gNB to the UE. That is, the network side may send configuration signaling (independently or together with other configuration signaling) for a search space of an initial signal of one or more UEs. Table 1 shows a specific example of the foregoing RRC. SearchSpaceId in Table 1 may be used to indicate that the configuration signaling is for a search space of an initial signal of one or more UEs (for example, a group of UEs in a cell). In the example shown in Table 1, a quantity of blind detection times of the initial signal is 1 for each symbol on which detection is performed within the COT, and a position for blind detection is a symbol 0. A quantity of blind detection times of the initial signal is 1 for each symbol on which detection is performed outside the COT, and positions for blind detection are symbols 0, 1, 3, and 7. In another example, a quantity of blind detection times of the initial signal is 1 for each symbol on which detection is performed within the COT, and a position for blind detection is the symbol 0, the symbol 1, a symbol 2, or any combination of the symbols 0, 1, and 2.

GC-PDCCH that are detected for the first time as an initial signal, and determines that the gNB has started to perform downlink transmission. It should be additionally noted that the combination that is of the GC-DMRS and the GC-PDCCH and that is detected by the UE for the first time may be a combination that is of a GC-DMRS and a GC-PDCCH and that is sent for the first time after the network side LBT succeeds, or may be a combination that is of a GC-DMRS

TABLE 1

```
SearchSpace ::=              SEQUENCE {
   searchSpaceId             SearchSpaceId,
   controlResourceSetId      ControlResourceSetId
-- Cond SetupOnly
   monitoringPosition        CHOICE {
      Outside COT            BITMAP {1 1 0 1 0 0 0 1 0 0 0 0 0 0}
("1" indicates a position of a symbol at which an initial signal needs
to be blindly detected in one 14-symbol slot, is only an example, and may be another value.)
      Within COT             BITMAP {1 0 0 0 0 0 0 0 0 0 0 0 0 0}
("1" indicates a position of a symbol at which an initial signal needs
to be blindly detected in one 14-symbol slot, is only an example, and may be another value.)
      Monitoringfrequency    CHOICE {
         Outside COT         slot1 (indicating that initial signal detection needs to
be performed in each slot outside the COT, where this parameter is only an example and may
be set to another value.)
         Within COT          ENUMERATED {slot1, slot2}
(indicating that initial signal detection needs to be performed
every one or two slots within the COT, where this parameter is only an example and may be
another value.)
         }
      }
OPTIONAL, -- Cond Setup
      searchSpaceType        CHOICE {
         common              SEQUENCE {
            dci-Format2-0    SEQUENCE {
               nrofCandidates SEQUENCE {
                  aggregationLevel4   ENUMERATED
{n1, n2}
(where this parameter
is only an example, the aggregation level may be another value, and n1 or n2 is a quantity of
blind detection times for each symbol on which detection is performed.)
            } ...
   }
```

In a specific example, in the foregoing method, the network side (the gNB or the cell) sends one or more combinations of a GC-DMRS and a GC-PDCCH based on the configuration of the initial signal.

If transmission starts from the symbol 1, 3, or 7 in the slot, the gNB performs downlink data transmission in the first partial slot in a mini-slot manner. In this case, there are relatively few available downlink resources. For example, only two symbols in a 2-symbol mini-slot can be used for transmission, and both the GC-DMRS and the GC-PDCCH need to occupy the foregoing resources. Therefore, preferably, the search space of the GC-PDCCH includes a UE-specific PDCCH of one or more UEs. Specifically, the UE-specific PDCCH is fallback DCI. For example, an NR DCI 1_0 format may be used, that is, a relatively small quantity of bits are used to carry downlink control indication information, thereby reducing control information overheads and improving mini-slot transmission efficiency.

If transmission starts from the symbol 0 in the slot, the gNB performs downlink data transmission in a full slot manner. Generally, the UE-specific PDCCH of one or more UEs are sent in the configured UE-specific search space, and the one or more UE-specific PDCCHs do not need to use the NR DCI 1_0 format.

Correspondingly, on a receive side, in step 201, the UE detects a received signal, uses the GC-DMRS and the and a GC-PDCCH and that is sent by the gNB after the start of COT.

In addition, because the GC-DMRS and/or the GC-PDCCH carry common control information, for the UE that has detected the initial signal (a combination that is of a GC-DMRS and a GC-PDCCH and that is received for the first time), in addition to receiving downlink information based on a position of the initial signal and control information carried in the initial signal, the UE may further continue to perform retrieval within the COT based on a general configuration of a search space of the GC-DMRS and/or the GC-PDCCH, and obtain related common control information, to receive the downlink information.

Outside the COT (that is, no combination of a GC-DMRS and a GC-PDCCH is detected, that is, no initial signal is detected), retrieval of the initial signal (a combination of a GC-DMRS and a GC-PDCCH) continues to be performed based on a setting of a search space of the initial signal.

Figure 8A:
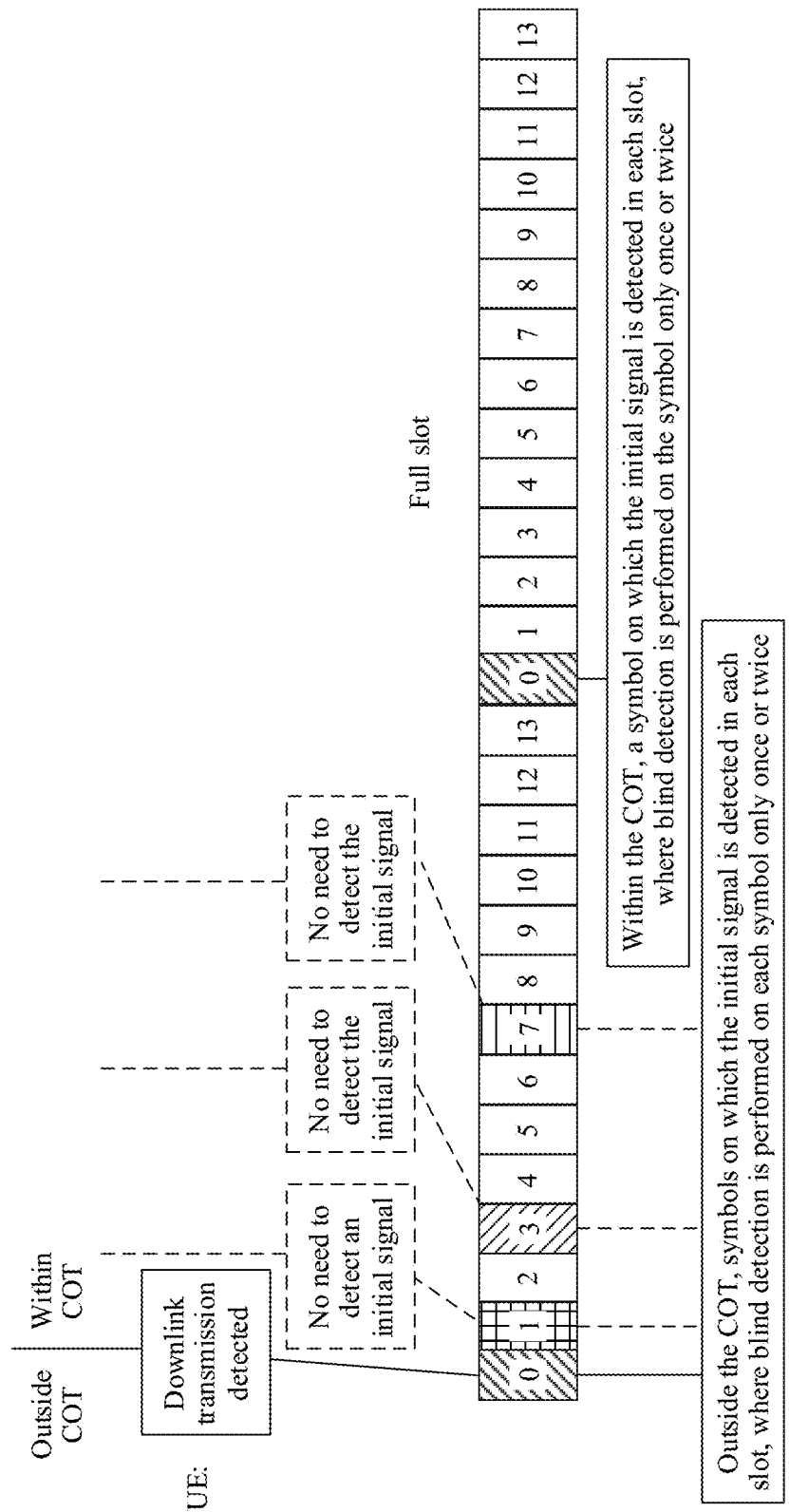
FIG. 8*a*, FIG. 8*b*, FIG. 8*c*, and FIG. 8*d* are simple schematic diagrams of symbol locations for detecting initial signals within and outside a COT according to an embodiment of this application.

Specifically, referring to simple schematic diagrams of an initial signal detection method shown in FIG. 8a, FIG. 8b, FIG. 8c, and FIG. 8d, 201 in the foregoing method includes the following steps:

Step 201a: If detecting that a start symbol of the GC-DMRS and the GC-PDCCH (starting downlink transmission) is the symbol 0 (that is, the first slot is a full slot, full slot), the UE needs to continue to detect the UE-specific PDCCH only on the zeroth symbol or the first X symbols (where X is configured by the gNB), where the UE-specific PDCCH uses a general format. In some cases, a subsequent GC-DMRS and GC-PDCCH are also detected based on a search space setting of the UE. Refer to FIG. 8*a*. Based on a configuration, the initial signal may no longer need to be detected in the slot, and the initial signal may be detected in one or more subsequent full slots to obtain updated common control information.

Figure 8B:
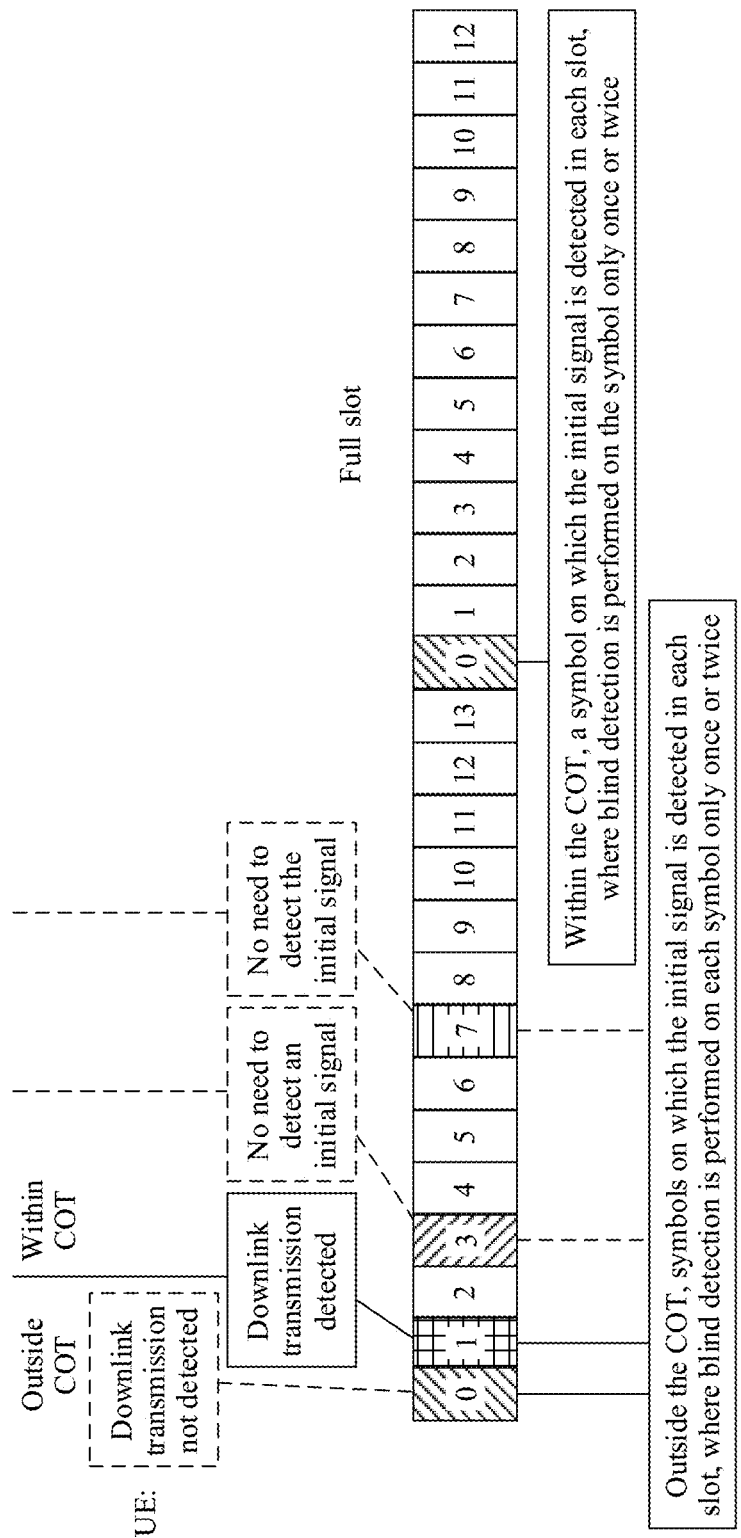
Figure 8C:
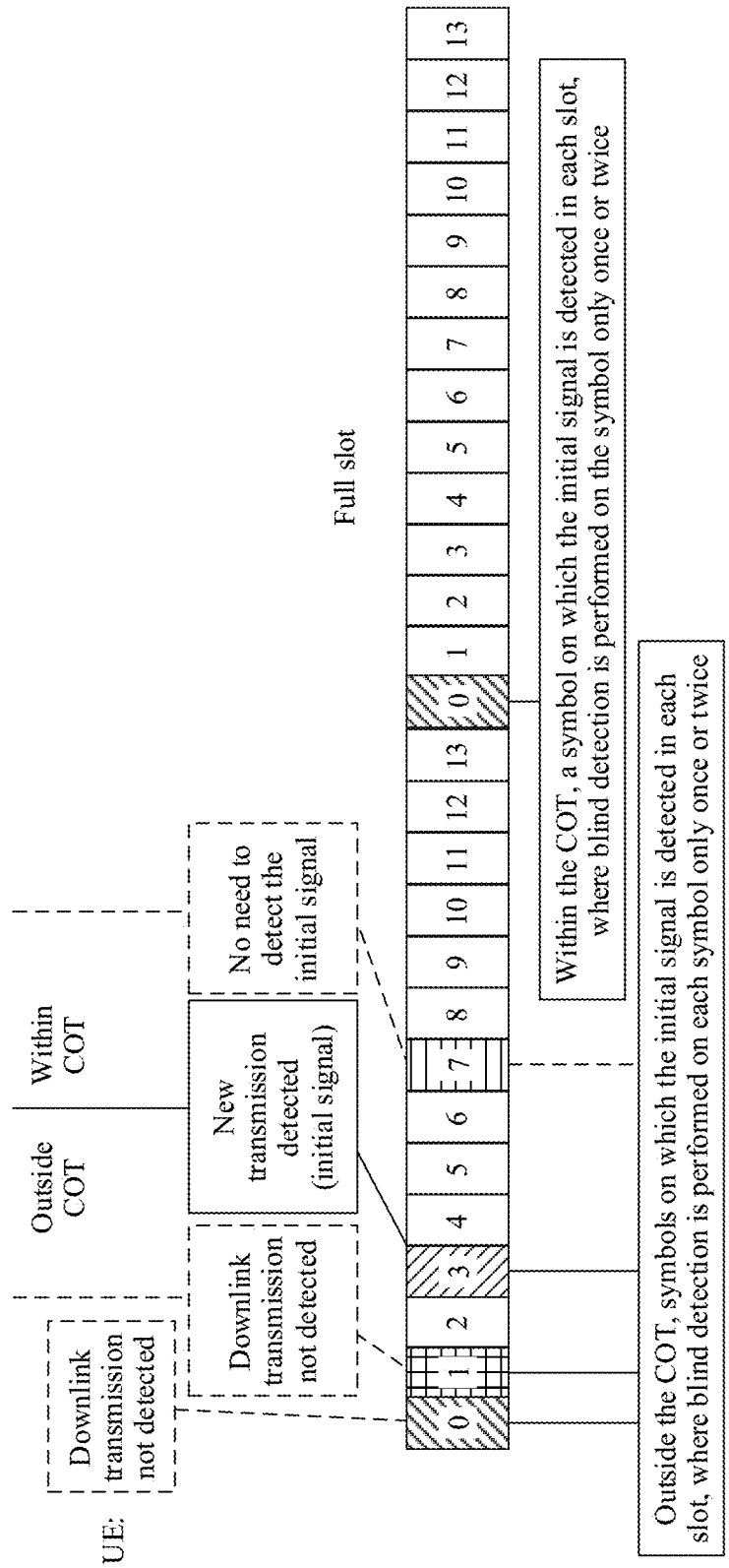
Figure 8D:
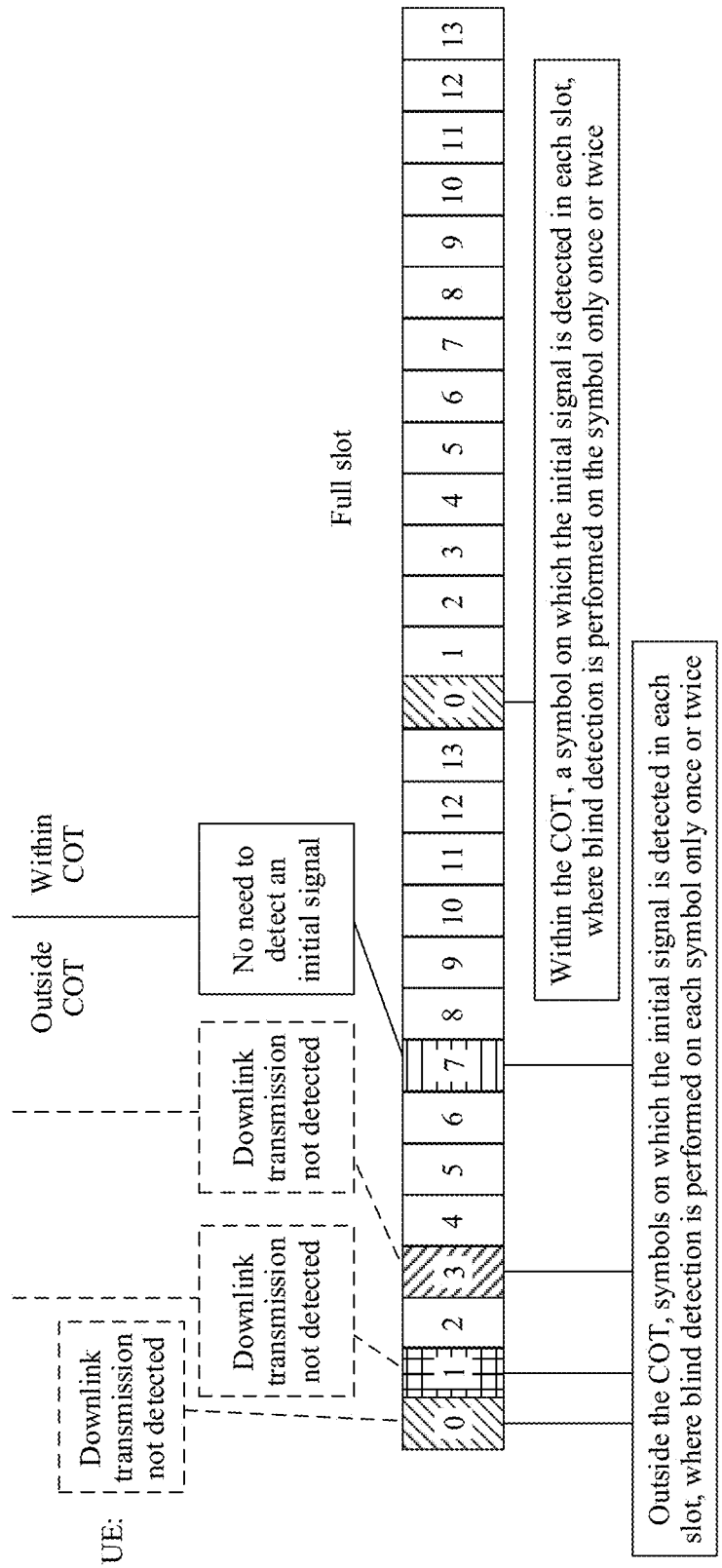

Step 201b: If detecting that a start symbol of the GC-DMRS and the GC-PDCCH (starting downlink transmission) is another symbol after the symbol 0 (that is, the first slot is a partial slot, partial slot), the UE further blindly detects the UE-specific PDCCH in the search space of the GC-PDCCH by using a C-RNTI of the UE. The UE-specific PDCCH carries fallback DCI, for example, in the NR DCI 1_0 format. Refer to FIG. 8*b*, FIG. 8*c*, and FIG. 8*d*. Based on the configuration, the initial signal may no longer need to be detected at a symbol position that is in the slot and that is after a symbol position at which the initial signal is detected, but the initial signal may be detected in one or more subsequent full slots to obtain updated common control information.

Step 201b1: If detecting the GC-DMRS and the GC-PDCCH and detecting the UE-specific PDCCH of the UE, the UE further parses downlink data in the mini-slot.

Step 201b2: If detecting the GC-DMRS and the GC-PDCCH, but not detecting the UE-specific PDCCH of the UE, the UE continues to detect the UE-specific PDCCH in another search space of the GC-PDCCH (for example, a start position of the next mini-slot or slot) or a UE-specific search space.

A specific example of the foregoing solution includes:

After detecting a GC-PDCCH and a GC-DMRS on a symbol 1 (the second symbol) in the first partial slot, UE 1 does not find a PDCCH of the UE in a search space of the GC-PDCCH. In this case, the UE 1 attempts to continue detecting, in the configured GC-PDCCH search space (for example, another symbol (for example, a symbol 3 or a symbol 7) in the partial slot), whether there is a fallback PDCCH scrambled by using a C-RNTI of the UE 1, or detecting whether there is a PDCCH scrambled by using the C-RNTI of the UE 1 in a UE specific search space.

If no UE-specific PDCCH of the UE is detected in the partial slot (for example, the symbol 3 or the symbol 7), in the second full slot or a subsequent full slot, the UE needs to detect a GC-PDCCH and a GC-DMRS (a search space of a GC-PDCCH and a GC-DMRS) only on the zeroth or the first X (where X is configured by the gNB, and for example, is 3) symbols, and further detect the UE-specific PDCCH in the UE-specific search space after detecting the GC-PDCCH and the GC-DMRS.

Refer to the foregoing 101. Because the transmit side sends the GC-PDCCH and/or the GC-DMRS a plurality of times, after receiving the GC-PDCCH, the UE may obtain an updated remaining length of the COT, an uplink/downlink indication of a subsequent slot, and other common information, and may obtain, after receiving the UE-specific PDCCH, whether there is downlink data sent by the gNB to the UE in the slot. The UE-specific PDCCH may be carried in a GC-PDCCH search space, or may be carried in a UE-specific PDCCH search space configured by the gNB. The GC-PDCCH search space or the UE-specific PDCCH search space is configured by the gNB in advance by using signaling such as RRC, RMSI, or OSI, or is directly provided in a standard.

Implementation 2

It can be learned from the background that a gNB may configure a BWP (bandwidth part, bandwidth part) for UE to receive downlink data. The BWP may include one or more sub-channels, and a bandwidth of the sub-channel is the same as a bandwidth for performing LBT in NRU. For example, the bandwidth of the sub-channel is 20 MHz, and the BWP may be an integer multiple of 20 MHz, for example, 80 MHz.

For ease of subsequent description, it is first explained as follows: The following "sub-channel information" includes information such as a COT remaining time of a sub-channel that passes LBT and/or an uplink/downlink configuration of each slot.

In an Example 1:

On a transmit side, in 301, the gNB passes LBT on a plurality of sub-channels, and the gNB may separately send a GC-DMRS and a GC-PDCCH on (all) the plurality of sub-channels. Specifically, a GC-PDCCH on one sub-channel carries only information about the one sub-channel, and does not carry information about another sub-channel.

Correspondingly, on a receive side, in 401, the UE needs to blindly detect the GC-DMRS and/or the GC-PDCCH and a UE-specific PDCCH on each sub-channel in the configured BWP. Refer to the following description. Preferably, blind detection may be sequentially performed based on a priority sequence that is of the sub-channels and that is configured for the UE. If the GC-DMRS, the GC-PDCCH, and the UE-specific PDCCH are detected on a sub-channel with a higher priority, detection of another sub-channel may be stopped. Specifically, sub-channel priority sequences for UEs may be different, or may be the same.

In Another Example 2:

On a transmit side, in 501, the gNB passes LBT on a plurality of sub-channels, and the gNB may send a GC-DMRS and a GC-PDCCH on one of the plurality of sub-channels. Refer to the following description. The one may be determined according to a rule, for example, a priority. For example, the particular sub-channel is a sub-channel with a highest priority and passing LBT. A GC-PDCCH on one sub-channel may include information about the plurality of sub-channels. Preferably, a GC-PDCCH on one sub-channel includes information about the sub-channel and information about another sub-channel. In addition, in the example 2, a UE-specific PDCCH does not support cross-sub-channel scheduling, that is, a UE-specific PDCCH sent on one sub-channel is used to schedule or indicate a time-frequency resource only on the sub-channel, but cannot be used to schedule or indicate, for downlink transmission, a time-frequency resource on another sub-channel.

Correspondingly, on a receive side, in 601, after detecting the GC-DMRS and the GC-PDCCH on one or some sub-channels in the configured BWP, the UE may obtain, based on the GC-PDCCH, information about a plurality of sub-channels that pass LBT, and then, blindly detect a UE-specific PDCCH scrambled by using a C-RNTI of the UE in a GC-PDCCH search space corresponding to each sub-channel that passes LBT (for example, a fallback PDCCH (which may use the NR DCI 1_0 format) in a mini-slot or a general UE-specific PDCCH). Preferably, referring to the following, the one or some sub-channels in the foregoing configured BWP may be determined according to a rule, for example, a priority. The foregoing "blindly detect a UE-specific PDCCH scrambled by using a C-RNTI of the UE in a GC-PDCCH search space corresponding to each sub-channel that passes LBT" may be performing blind detection sequentially based on a priority sequence of the sub-channels.

In Another Example 3:

701: The gNB passes LBT on a plurality of sub-channels, and the gNB may send a GC-DMRS and a GC-PDCCH on one of the plurality of sub-channels that pass LBT. A GC-PDCCH on one sub-channel may include information about the plurality of sub-channels, and the UE-specific PDCCH supports cross-sub-channel scheduling. The cross-sub-channel scheduling means that a UE-specific PDCCH sent on one sub-channel may be used to schedule or indicate, for downlink transmission, time-frequency resources on the sub-channel and another sub-channel. In this example, the gNB transmits the GC-DMRS and/or the GC-PDCCH and the UE-specific PDCCH (if any) only on a particular sub-channel passing LBT. Preferably, similar to the example 2, the one or some sub-channels may be determined according to a rule, for example, a priority. For example, the particular sub-channel is a sub-channel with a highest priority and passing LBT. The "some sub-channels" are a plurality of sub-channels having a highest priority to a second highest priority and passing LBT. The gNB may transmit only the GC-DMRS but not the GC-PDCCH on another sub-channel, or the gNB may transmit neither the GC-DMRS nor the GC-PDCCH on another sub-channel.

Correspondingly, on a receive side, in 801, after detecting the GC-DMRS and the GC-PDCCH on a particular sub-channel in the configured BWP, the UE may obtain, based on the GC-PDCCH, information about a plurality of sub-channels that pass LBT, for example, COT information of each sub-channel in all sub-channels that pass LBT in the BWP, and common information such as an uplink/downlink configuration on a plurality of sub-channels within the COT, and may further obtain corresponding downlink data scheduling information on each sub-channel. The UE continues to blindly detect, in the GC-PDCCH search space of the sub-channel, the UE-specific PDCCH scrambled by using the C-RNTI of the UE (where the UE-specific PDCCH carries fallback DCI in the mini-slot (where the UE-specific PDCCH may use the NR DCI 1_0 format), or a general UE-specific PDCCH).

As mentioned in the foregoing examples, the gNB may send any combination of the GC-PDCCH, the UE-specific PDCCH, or the GC-DMRS on one or more sub-channels that comply with a specific rule, and correspondingly, the UE performs blind detection on the one or more sub-channels that comply with a specific rule, so that overheads of blind detection of the PDCCH by the UE can be reduced. For example, the rule refers to the priority sequence of sub-channels. Preferably, in the foregoing example 2 or example 3, the gNB sends any combination of the GC-PDCCH, the UE-specific PDCCH, or the GC-DMRS only on one sub-channel that complies with a specific rule, and correspondingly, the UE performs blind detection only on one sub-channel that complies with the rule, thereby further reducing overheads of blind detection of the PDCCH by the UE.

The foregoing rule may be that one or more specific sub-channels correspond to one priority, or each sub-channel corresponds to one priority. The priority may be fixed or changes with time, and the priority information may be configured by the gNB in advance.

For example, a BWP configured for one UE includes four sub-channels: sub-channels 0, 1, 2, and 3, and a priority of sending the PDCCH on the four sub-channels is {sub-channel 1, 3, 2, 0}. When the gNB sends the GC-DMRS and the GC-PDCCH only on one sub-channel that passes LBT, the UE sequentially detects the GC-DMRS and the GC-PDCCH in a sequence of the sub-channels 1, 3, 2, and 0. That is, when the GC-DMRS and the GC-PDCCH are not detected on the sub-channel 1, detection is performed on the sub-channel 3. When no GC-DMRS or GC-PDCCH is detected on the sub-channel 3, detection is performed on the sub-channel 2. When no GC-DMRS or GC-PDCCH is detected on the sub-channel 2, detection is performed on the sub-channel 0.

The foregoing implementations may be split or combined according to technical logic.

For example, the gNB transmits the GC-DMRS on all sub-channels that pass LBT, and transmits the GC-PDCCH only on one of the sub-channels that pass LBT (for example, a sub-channel with a highest priority in the sub-channels that pass LBT). Correspondingly, the UE first detects the GC-DMRS on all sub-channels in the BWP, and then detects the GC-PDCCH on a sub-channel with a highest priority in sub-channels on which the GC-DMRS is detected. For example, the UE learns, based on the GC-DMRS, that the sub-channels 2 and 3 pass LBT, and learns, based on the priority {sub-channels 1, 3, 2, 0} of the sub-channels, that the gNB sends the PDCCH only on the sub-channel 3. Correspondingly, the UE blindly detects the GC-PDCCH and the UE-specific PDCCH only on the sub-channel 3. In this way, blind detection overheads are further reduced.

For another example, for the example 3 in which the UE-specific PDCCH supports cross-carrier scheduling, a manner in which the UE parses the UE-specific PDCCH may be the same as a manner in which the UE parses the GC-PDCCH. For the example 2 in which the UE-specific PDCCH does not support cross-carrier scheduling, the UE obtains sub-channel LBT information in the BWP after parsing the GC-PDCCH, and then sequentially detects possible UE-specific PDCCHs on sub-channels that pass LBT (for example, sequentially performs detection in a priority sequence).

For a specific blind detection process of the UE on a particular sub-channel in the foregoing examples, refer to the solution in the implementation 1. Alternatively, the process may be a proper variation or combination of the implementation 1, or certainly, may be another possible detection solution. Details are not described herein.

Figure 9:
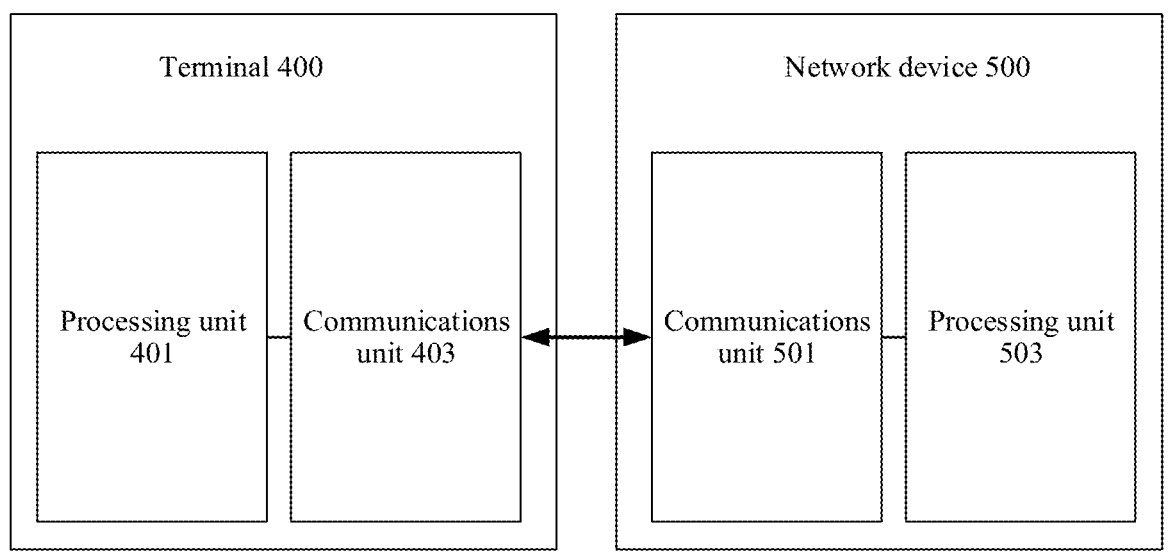
FIG. 9 is a functional block diagram of a wireless communications system, a terminal, and a network device according to this application.

In addition, the embodiments of the present invention further provide a wireless communications system. The wireless communications system may be the wireless communications system 100 shown in FIG. 1, or may be the wireless communications system 10 shown in FIG. 9, and may include a network device and a terminal. The terminal may be the terminal in the foregoing embodiments, and the network device may be the network device in the foregoing embodiments. Specifically, the terminal may be the terminal 300 shown in FIG. 2, and the network device may be the network device 400 shown in FIG. 3. The terminal may alternatively be the terminal 400 shown in FIG. 9, and the network device may alternatively be the network device 500 shown in FIG. 9. For specific implementations of the network and the terminal, refer to the foregoing embodiments. Details are not described herein again.

The network device shown in FIG. 2 is used as an example. The network device processor 405 is configured to control the transmitter 407 to perform sending in an unlicensed frequency band and/or a licensed frequency band, and control the receiver 409 to perform receiving in the unlicensed frequency band and/or the licensed frequency band. The transmitter 407 is configured to support the network device in performing a process of transmitting data and/or signaling. The receiver 409 is configured to support the network device in performing a process of receiving data and/or signaling. The memory 405 is configured to store program code and data of the network device.

Specifically, the transmitter 407 of the network device may be configured to perform the foregoing methods for sending the initial signal and another signal in 101, 301, 501, 701, or the like. For another function and working procedure, refer to the foregoing implementations. Details are not described herein again.

For specific implementations of the components in the network device, refer to the foregoing method embodiments. Details are not described herein again.

The terminal shown in FIG. 2 is used as an example. The terminal processor 304 is configured to invoke the instructions stored in the memory 312 to control the transmitter 306 to perform sending in the unlicensed frequency band and/or the licensed frequency band, and control the receiver 308 to perform receiving in the unlicensed frequency band and/or the licensed frequency band. The transmitter 306 is configured to support the terminal in performing a process of transmitting data and/or signaling. The receiver 308 is configured to support the terminal in performing a process of receiving data and/or signaling. The memory 312 is configured to store program code and data of the terminal.

Specifically, the receiver 308 may be used in the method in 201, 401, 601, 801, or the like. For another function and working procedure, refer to the foregoing implementations. Details are not described herein again.

Specifically, the transmitter 306 may be configured to send uplink data on a detected idle frequency domain resource.

For specific implementations of the components in the terminal, refer to the foregoing method embodiments. Details are not described herein again.

A person skilled in the art may understand that different division may be performed to obtain each functional module in the implementation, without affecting implementation of the product. For example, an apparatus on a transmit side may be divided into an LBT module, configured to implement an LBT function in FIG. 4A and/or FIG. 4B, and may be divided into an initial signal sending module. However, in the product, the foregoing modules may be integrated into software and hardware, for example, a processor or an integrated circuit.

Methods or algorithm steps described in combination with the content disclosed in the embodiments of the present invention may be implemented by hardware, or may be implemented by the processor by executing a software instruction. The software instruction may include a corresponding software module. The software module may be stored in a RAM, a flash memory, a ROM, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a transceiver or a relay device. Certainly, the processor and the storage medium may alternatively exist in a radio access network device or a terminal device as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. An initial signal detection method, comprising:
    performing, by a user equipment (UE), detection on one or more sub-channels on an unlicensed spectrum; and
    determining, based on a combination of a group common-demodulation reference signal (GC-DMRS) and a GC-physical downlink control channel (GC-PDCCH) that is detected by the UE a first time that downlink transmission has started or that a channel occupancy time (COT) has started.

2. The method according to claim 1, wherein a configuration of a search space of an initial signal of the UE satisfies at least one of the following:
    an aggregation level of the GC-PDCCH in the initial signal is set to a fixed value; or
    a maximum quantity of blind detection times of the GC-PDCCH in the initial signal is one or two times in each slot.

3. The method according to claim 2, further comprising:
    receiving configuration information of the search space of the initial signal of the UE, wherein the configuration information includes the configuration of the search space of the initial signal of the UE.

4. The method according to claim 2, wherein a first UE-specific PDCCH uses a new radio (NR) downlink control information (DCI) 1_0 format.

5. The method according to claim 1, wherein the combination of the GC-DMRS and the GC-PDCCH, and that is detected by the UE the first time is located at a symbol 1, 3, or 7 in a slot, and the method further comprises:
    continuing, by the UE, to search a search space of the GC-PDCCH for a first UE-specific PDCCH of the UE.

6. The method according to claim 1, wherein the combination of the GC-DMRS and the GC-PDCCH, and that is detected by the UE the first time is located at a symbol 0 in a slot, and the method further comprises:
    searching, by the UE, a search space of a UE-specific PDCCH outside of a search space of the GC-PDCCH for the UE-specific PDCCH of the UE.

7. An initial signal transmission method, comprising:
    performing, by a network side, listen before talk (LBT) on one or more sub-channels on an unlicensed spectrum; and sending, by the network side, one or more combinations of a group common-demodulation reference signal (GC-DMRS) and a GC-physical downlink control channel (GC-PDCCH) on one or more sub-channels on which the LBT succeeds, wherein one of the one or more combinations of the GC-DMRS and the GC-PDCCH is used as an initial signal for downlink transmission.

8. The method according to claim 7, a configuration of a search space of an initial signal of one or more user equipment (UEs) satisfies at least the following:
an aggregation level of the GC-PDCCH in the initial signal is set to a fixed value; or
a maximum quantity of blind detection times of the GC-PDCCH in the initial signal is one or two times for each symbol on which detection is performed.

9. The method according to claim 7, further comprising:
sending, by the network side, configuration information of the search space of the initial signal of the one or more UEs, wherein the configuration information includes the configuration of the search space of the initial signal of the UE.

10. The method according to claim 7, wherein a first sent combination of the GC-DMRS and the GC-PDCCH is located at a start location of a channel occupancy time (COT).

11. The method according to claim 7, wherein one of the sent one or more combinations of the GC-DMRS and the GC-PDCCH is located at a symbol 1, 3, or 7 in a slot, wherein a search space of the GC-PDCCH comprises a first UE-specific PDCCH of the one or more UEs.

12. The method according to claim 11, wherein the first UE-specific PDCCH uses a new radio (NR) downlink control information (DCI) 1_0 format.

13. The method according to claim 7, wherein one of the one or more combinations of the GC-DMRS and the GC-PDCCH is located at a symbol 0 in a slot, wherein outside of a search space of the GC-PDCCH, a search space of a UE-specific PDCCH comprises one or more UE-specific PDCCHs.

14. A communication apparatus, comprising:
a non-transitory memory configured to store non-transitory instructions; and
one or more processors coupled with the non-transitory memory, wherein the one or more processors are configured to execute the non-transitory instructions to cause the apparatus to:
perform detection on one or more sub-channels on an unlicensed spectrum; and
determine, based on a combination of a group common-demodulation reference signal GC-DMRS) and a GC-physical downlink control channel (GC-PDCCH) that is detected for a first time, that downlink transmission has started or that a channel occupancy time (COT) has started.

15. The apparatus according to claim 14, wherein a configuration of a search space of an initial signal of a user equipment (UE) satisfies at least one of the following:
an aggregation level of the GC-PDCCH in the initial signal is set to a fixed value; or
a maximum quantity of blind detection times of the GC-PDCCH in the initial signal is one or two times in each slot.

16. The apparatus according to claim 15, wherein the one or more processors are configured to execute the non-transitory instructions to further cause the apparatus to receive configuration information of the search space of the initial signal of the apparatus, wherein the configuration information includes the configuration of the search space of the initial signal of the apparatus.

17. The apparatus according to claim 16, wherein a first UE-specific PDCCH uses a new radio (NR) downlink control information (DCI) 1_0 format.

18. The apparatus according to claim 15, wherein the combination of the GC-DMRS and the and that is detected by the apparatus the first time is located at a symbol 1, 3, or 7 in a slot, and the one or more processors are configured to execute the non-transitory instructions to further cause the apparatus to continue to search a search space of the GC-PDCCH for a first UE-specific PDCCH of the UE.

19. The apparatus according to claim 15, wherein the combination of the GC-DMRS and the and that is detected by the apparatus for the first time is located at a symbol 0 in a slot, and the one or more processors are configured to execute the non-transitory instructions to further cause the apparatus to search a search space of a UE-specific PDCCH outside of a search space of the GC-PDCCH for the UE-specific PDCCH of the apparatus.

* * * * *